United States Patent [19]

Formanek

[11] Patent Number: 4,584,168
[45] Date of Patent: Apr. 22, 1986

[54] SYSTEM FOR CONTROLLING DESTRUCTIVE VIBRATION OF A NUCLEAR CONTROL ROD

[75] Inventor: Frank J. Formanek, West Suffield, Conn.

[73] Assignee: Combustion Engineering, Inc., Windsor, Conn.

[21] Appl. No.: 551,250

[22] Filed: Nov. 14, 1983

[51] Int. Cl.[4] .............................. G21C 1/01
[52] U.S. Cl. .................... 376/353; 376/243; 376/292; 376/352
[58] Field of Search ............... 376/243, 292, 352, 353, 376/443

[56] References Cited

U.S. PATENT DOCUMENTS 4,164,443  8/1979  Gibbons et al. ............... 376/353
4,231,843  11/1980 Myron et al. ................. 376/353
4,313,796  2/1982  Buettiker ..................... 376/353

FOREIGN PATENT DOCUMENTS 2105924  8/1971  Fed. Rep. of Germany ...... 376/352

Primary Examiner—Deborah L. Kyle
Assistant Examiner—Richard W. Wendtland

[57] ABSTRACT

A single guide tube and tube sheet tube, as an upper extension, carries a nuclear control rod in storage, poised for downward insertion into the guide tube. An inner tube, termed a bypass tube, is mounted within the cylindrical tube sheet tube and fitted closely about the control rod. Mounting connections between the upper and lower ends of the bypass tube and the tube sheet tube are provided to route the coolant in control of the rod vibration.

4 Claims, 9 Drawing Figures

Fig. 8
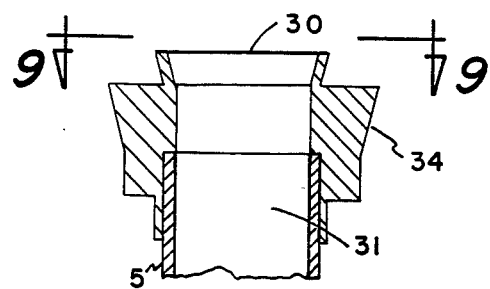
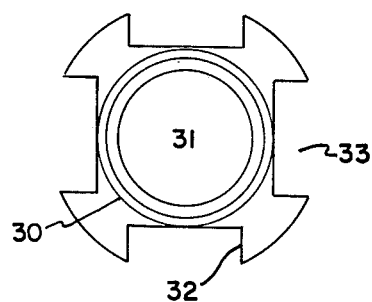
Fig. 9

SYSTEM FOR CONTROLLING DESTRUCTIVE VIBRATION OF A NUCLEAR CONTROL ROD

TECHNICAL FIELD

This invention relates to eliminating destructive flow-induced vibration of a solid cylindrical body within a tubular member. More particularly, this invention relates to eliminating the destructive vibration of a nuclear reactor control rod in its guide tube.

BACKGROUND ART

The fission rate and thus the heat generation in modern power reactors is usually controlled by the insertion and removal of control rods into or between fuel assemblies in the reactor core. Particularly in reactors of the pressurized-water type, cylindrical control rods are reciprocated within guide tubes which are part of the fuel assembly. The fuel assemblies are subjected to the flow of primary coolant in order to remove the heat generated in the fuel. When in the core, control rods are also heated through the nuclear transformation associated with their high neutron absorption rate, and so the control rods must also be cooled. Thus, a minimum of coolant must flow through the guide tube and over the rod at all times to control the temperature of the rod.

During power production, most of the control rods are maintained substantially withdrawn above the core. The lower tips of the rods, however, are not completely withdrawn from the guide tubes. Recent operating experience has shown that rodded fuel assemblies having been in an operating reactor for a period of time have significant damage on the inner walls of the guide tubes at precisely the elevation corresponding to the control rod tips.

Flow-induced periodic vibrations have been observed in arrangements having cylindrical rods eccentrically located in an annular diffuser. It is believed that two kinds of vortices interact as follows to produce the periodic driving force. When the rod is centered in the tube, a diffuser vortex ring forms around the rod (like a donut) in the diffuser region as the flow separates upon exiting the guide tube. If the rod becomes eccentric in the tube, axial vortices, also called secondary flows, originate near the control rod tip and travel along the rod before entering the diffuser region where vortex bursting occurs. The interaction in the diffuser region of the bursting axial vortices with the diffuser vortex ring produces an oscillating driving force on the control rod.

It has been proposed to provide a circumferential fence in the flow path downstream of the diffuser, or to provide strakes in the outer wall of the diffuser, starting at the diffuser mouth and extending longitudinally downstream of the diffuser. These solutions are not practical for use in nuclear reactors because the diffuser region can be very large.

Since nuclear reactor control rods often are not exactly centered in their guide tubes, the rod tip has a tendency to assume a rest position against the inner wall of the tube. Any significant tip vibration against the inside of the guide tube could damage the inner wall by perforating the guide tube. It has been found that, except for significantly reducing the mass flow rate in the guide tube, the above suggested remedies for reducing flow-induced vibration of a control rod are only marginally effective. If the flow rate is reduced sufficiently to eliminate rod vibration, then the rod is not adequately cooled.

Still another approach to eliminating control rod vibration is disclosed in Buettiker U.S. Pat. No. 4,313,796 issued Feb. 2, 1982. In this system the guide tube post has been modified to provide a polygonal cross section at the exit to the diffuser region. When due to random fluctuation, the rod assumes an eccentric position near the wall of the post, the polygonal post geometry provides a relatively large angle between the post wall and the surface of the rod near the wall. It has been found that if this angle is too small, strong secondary flows develop along the length of the control rod and interact with other vorticies in the diffuser region, to produce the vibration driving force. The polygonal cross section in the post modifies the secondary flow to reduce the intensity of the interaction with the diffuser vortices.

In nuclear reactor designs where a tubular extension is provided from the upper end of the guide tube, a more simple mechanical/hydraulic structure can be provided to overcome forces on the control rod which create its destructive vibration. Not only is the mechanical/hydraulic structure simple in construction, but it can be readily mounted as a retrofit in a nuclear reactor.

DISCLOSURE OF THE INVENTION

The present invention contemplates the provision of an upward cylindrical extension of a guide tube for a nuclear control rod in which extension an inner cylinder is mounted and arranged to mechanically and hydraulically stabilize the control rod as the rod extends through the inner cylinder and down into the guide tube.

The invention further contemplates the inner cylinder mounted to provide bypass of coolant around the control rod and through the annular space between the inner cylinder and the tubular extension of the guide tube.

Other objects, advantages and features of this invention will become apparent to one skilled in the art upon consideration of the written specification, appended claims, and attached drawings.

BRIEF DESIGNATION OF THE DRAWINGS

FIG. 8 is a sectioned elevation of the upper diffuser nut of the bypass tube; and FIG. 9 is a plan view of the nut of FIG. 8.

BEST MODE FOR CARRYING OUT THE INVENTION

Prolog

Objectively, the present problem centers around the transverse vibration of an elongated, solid rod within a conduit. It is in superimposing this problem on the environment of a nuclear reactor that the terminology becomes esoteric. The vibrating rod causing the problem is the control rod, or finger, which must be stored above the reactor fuel, ready to be inserted downward into the fuel and thereby control the heat generated by the fuel. The rod is not only stored in a tubular structure above the fuel, but is provided a downward extension of that tube to guide the rod to its lowermost position within the fuel. Stated in more formal terms, the rod must be controlled in its transverse movements to prevent encounter with and damage to the lower guide tube within the lower fuel assembly.

The destructive transverse movements of the rod are generated by hydraulic forces. These forces originate in the flow of liquid coolant up through the guide tube and within the annular space between the rod and tube. In counteracting the hydraulic forces of turbulence placed upon the rod, contact of the rod with the liquid coolant is decreased, while mechanical contact with the rod is increased. This dual approach to the solution of the problem is made possible by what can be described as a constructive upward tubular extension of the guide tube. The present invention is embodied in structure mounted within this tubular extension, which is termed a tube sheet tube in some types of nuclear reactors. The structural embodiment of the invention is mounted within this tube sheet tube, and its hydraulic function is described as bypassing the tube sheet tube with the liquid coolant while mechanically limiting the transverse or sidewise motion of the control rod within.

Dimensionally, the guide tube is in the order of 171" in length and is axially extended upward by the tube sheet tube which is in the order of 5 feet. Coolant enters the guide tube through three holes in its lower end and discharges from the guide tube at the rate of 7 to 15 GPM. This flow is passed up and around the control rod in the paths which will provide the required cooling of the rod, while preventing the destructive vibration of the rod.

FIG. 1

Figure 1:
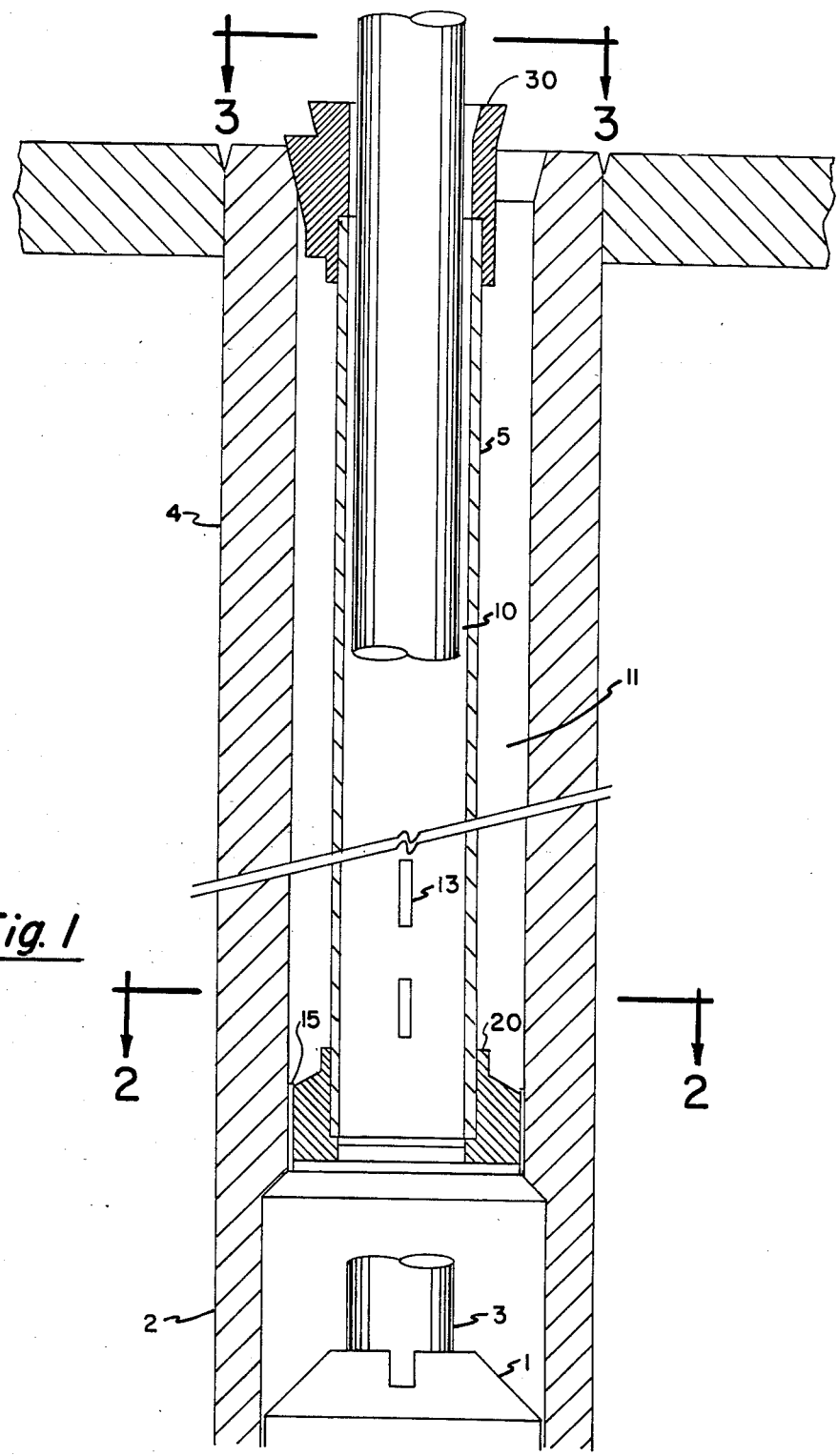
FIG. 1 is a sectioned elevation of the upper tubular extension of a nuclear control rod guide tube within which is structure embodying the present invention.

Little of the overall organization of the reactor fuel assembly or the reactor vessel, itself, is disclosed. The fuel assembly 1 extends below the disclosure of FIG. 1, and only the upper discharge end of guide tube 2 appears as extended up from below. In its withdrawn or stored position above the guide tube, the rod protrudes into the guide tube in the order of 19". Tube sheet tube 4 is axially aligned with guide tube 2 and extends upward to centralize the embodying structure of the invention disclosed in FIG. 1. Little attention is devoted to the external structural support of tube sheet tube 4, and control rod 3 is supported by control element assembly (CEA) structure above the tube sheet tube beyond the disclosure of FIG. 1.

Within tube sheet tube 4, bypass tube 5 is axially and rigidly mounted to accommodate control rod 3 therethrough. The flow of liquid coolant after it is discharged from the upper end of the lower guide tube is directed through annular space 10 between the external surface of rod 3 and the internal surface of bypass tube 5, and annular space 11 between the external surface of bypass tube 5 and the internal surface of tube sheet tube 4. Thus, two paths are provided for the coolant in its upward flow through tube sheet tube 4. The total of the liquid coolant flowing up through these paths provided by the annular spaces is in that quantity necessary to cool rod 3. However, this flow is divided and routed by the structure embodying the invention to prevent the destructive vibration of rod 3.

In greater detail, that portion of the coolant directed up annular space 11 is far greater than that portion directed up annular space 10. By so proportioning the flows, the force of any turbulence generated in the greater flow is isolated from control rod 3 by bypass tube 5. The difference between the diameter of control rod 3 and the inner diameter of bypass tube 5 is, typically, in the order of 116 mils. Therefore, the transverse vibration of control rod 3 is mechanically limited to this 116 mils. The result is that the hydraulic control of bypassing the larger portion of the coolant, and the mechanical limitation of the rod movement, combine to prevent destructive vibration of control rod 3 as its lower end protrudes down into the upper end of guide tube 2.

To insure that the flow of that portion of the coolant up through annular space 10 is maintained laminar, it has been found necessary to provide a series of openings 13 through the wall of bypass tube 5. Typically, the elevation of openings 13 is in the order of 6" to 12" above the lower end of bypass tube 5. Some empirical adjustment of the number, size and location of openings 13 may be necessary to "tune" the amount of upwardly flowing coolant discharged from annular space 10 back into annular space 11 in preserving the laminar flow of that portion of the coolant flowing up annular space 10 to the upper discharge. In effect, a lubricating film of the coolant is provided, by this arrangement, between the rod and the inside of bypass tube 5. Together, both portions of the total flow control the temperature of rod 3 while it is hydraulically and mechanically prevented from inducing any destructive vibration.

There remains the disclosure of the details of the mechanical arrangement with which tube 5 is connected to tube sheet tube 4. This anchor structure is arranged to rigidily mount the bypass tube while dividing the coolant and providing its discharge from the top of bypass tube 5 and tube sheet tube 4.

Mounting Of The Bypass Tube - Lower Connection

Figure 2:
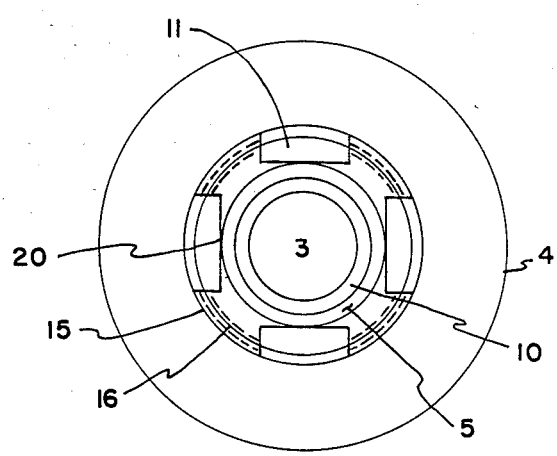
FIG. 2 is a section of FIG. 1 along lines 2—2.

FIG. 2 provides a plan of a sectioned assembly of the lower connection of bypass tube 5 with the internal wall of the tube sheet tube 4. The two structures forming this mounting are shown in detail in FIGS. 4–7. All of the details of these parts, and their assembly, will be referred to in disclosing this mounting.

It cannot be excessively emphasized that the specific form of the mounting may vary, depending on whether the bypass tube 5 is mounted in the tube sheet tube 4 in original construction of the reactor vessel, or as a retrofit in reactors already in service. In both events, mounting will be in the form and arrangement which will provide a division of the upwardly flowing coolant into two paths within the tube sheet tube around the control rod.

Figure 6:
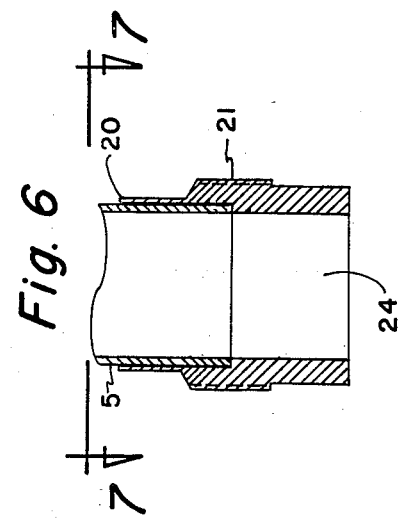
FIG. 6 is a sectioned elevation of the lower diffuser nut of the bypass tube.
Figure 7:
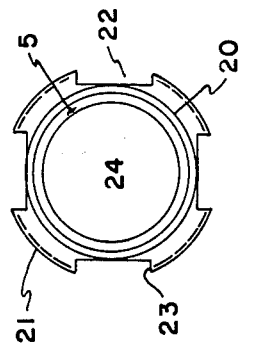
FIG. 7 is a plan view of the nut of FIG. 6.
Figure 4:
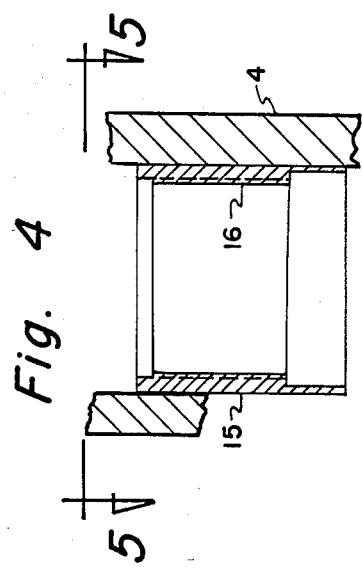
FIG. 4 is a sectioned elevation of the lower nut of the bypass tube mounting.
Figure 5:
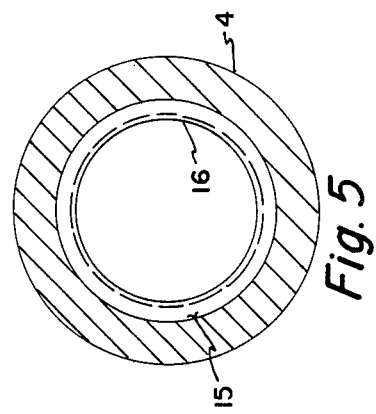
FIG. 5 is a plan view of the nut of FIG. 4.

The diffuser nut of FIGS. 6 and 7 will be mounted on the lower end of the bypass tube and fitted into the lower nut of FIGS. 4 and 5. The lower nut 15 is firmly attached to the lower end of the tube sheet tube and thereby forms a base to which the lower diffuser nut of FIGS. 6 and 7 is firmly anchored in relationship to the tube sheet tube.

In general, the lower nut 15 is a tubular ring which slides up into the lower end of the tube sheet tube. It does not matter whether the lower nut 15 is welded, threaded or otherwise secured to the internal wall of the tube sheet tube. In the actual reduction to practice, it formed an anchor and, in turn, provided a threaded engagement with the lower diffuser nut. These threads are indicated at 16, and a fragment of the lower end of tube sheet tube 4 is shown in FIGS. 4 and 5 for orientation. FIGS. 4 and 5 are to be taken together for this disclosure.

FIGS. 6 and 7 are to be taken together as the disclosure of the lower diffuser nut 20 which is threadedly engaged with the lower nut 15 at 21. The lower end of the bypass tube 5 is disclosed as sliding down into a counterbore of the internal bore of diffuser nut 20. Here, again, the manner of fixing the diffuser nut to the lower end of the bypass tube is immaterial to the invention. The union may be press-fit and/or welded into place. In the final analysis, the two units are threadedly engaged to lower nut 15.

The diffuser nut 20 is formed with vertical channels 22 and provide passageways for the coolant to flow up and into the annulus between the bypass tube and the tube sheet tube. The spline-like channels 22 leave extensions 23 between them on which the threads 21 are formed. In one aspect, the diffuser nut 20 becomes a spider, fixing the bypass tube actually within the tube sheet tube and extending its threaded extensions 23 into engagement with the internal wall of the tube sheet tube by way of the intermediately positioned lower nut 15.

It is to be noted that diffuser nut 20, positioned as it is on the lower end of the bypass tube, forms two paths for the up-flowing coolant. The major portion of the coolant flows up through the four vertical grooves 22 while the remainder of the coolant flows up through bore 24 and, thus, into the annular space between the control rod extending down through the bore and the internal walls of the bypass tube. It is reiterated that the coolant flowing up through bore 24 is provided outlets 13 in the walls of the bypass tube. As stated previously, it has been found necessary to provide these openings to preserve laminar flow of the coolant in the small annular space and around the control rod.

Mounting Of The Bypass Tube - Upper Connection

Figure 3:
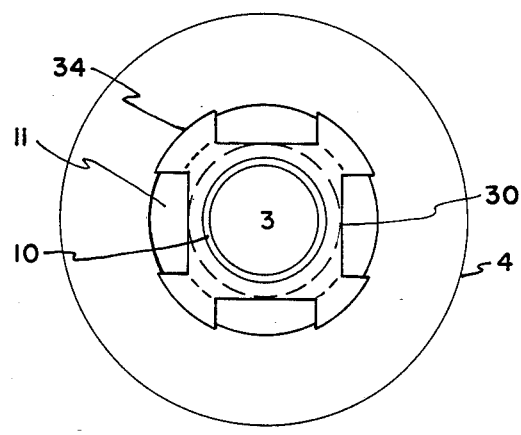
FIG. 3 is a section of FIG. 1 along lines 3—3.

FIG. 3 is an assembly of the diffuser nut of FIGS. 8 and 9 with the upper end of the bypass tube. The upper mounting on the end of bypass tube 5 is centralized by upper diffuser nut 30 disclosed in FIGS. 8 and 9. The assembly of FIG. 3 is to be taken with the disclosure of FIGS. 8 and 9 to have a complete understanding of this arrangement. Here, again, the specific arrangement of this upper connection may vary, depending on whether the bypass tube is to be mounted as original equipment, or as a retrofit. In any event, the form and arrangement must provide discharges for both paths of the coolant flowing up through the bypass tube and the tube sheet tube.

In FIG. 8, a fragment of the upper end of bypass tube 5 is disclosed on which the upper diffuser nut 30 is mounted. The bore 31 is sized to accommodate the passage of the control rod with a specified clearance to mechanically limit vibration. This bore 31 is counterbored from below so that it may be slipped over the upper end of the bypass tube. The body of the diffuser nut is then extended to the internal wall of the tube sheet tube with extensions 32. Extensions 32 are formed by providing vertical grooves 33. Grooves 33, of course, form passageways for the upwardly flowing coolant from the annular space between the tube sheet tube and the bypass tube. A laminar flow of the minor portion of the coolant flowing upward in the annular space between the control rod and the internal walls of the bypass tube passes up through bore 31.

To form a stable mounting relationship between the upper end of the tube sheet tube and the upper end of the bypass tube, the diffuser nut is flared ouwardly at 34. When the assembly of diffuser nuts and bypass tube is screwed down into the lower nut 15, the flare 34 moves downwardly to engage the upper edge of the tube sheet tube to prevent lateral movement of the bypass tube within the tube sheet tube.

Thus, with admittedly tedious repetition and verbose disclosure, the bypass tube is mounted firmly within the tube sheet tube and provides dual paths for the coolant discharged from the lower guide tube so as to militate against vibration of the control rod extending down through the tube sheet tube and into the lower guide tube of the fuel assembly.

Conclusion

In summation, each guide tube receives its share of coolant flowing up through the fuel assembly of a nuclear reactor. For each guide tube there is a control rod poised above the guide tube, ready to be lowered from this stored position as required to control the heat generated by the reactor fuel. As this liquid coolant gushes up the guide tube, it encounters the control rod dangling down into the guide tube. Turbulence in the liquid is generated by the encounter, and in reaction, the control rod is vibrated radially. Vibration of the control rod cannot be tolerated, as the vibrating rod mechanically encounters the sides of the guide tube with destructive force. Thus, the present invention is called upon to isolate the control rod from turbulence and mechanically encapsulate the control rod and limit its response to lateral forces which reach it.

In storage, the control rod must be cooled by the upwardly flowing liquid coolant. The present invention provides for heat exchange contact between the coolant and control rod; however, the invention provides bifurcation of the coolant flow stream. The larger portion of the coolant is directed to flow along the external surface of a tube mounted axially to the guide tube. The smaller portion of the coolant stream is provided a path between the control rod and the encapsulating bypass tube to preserve the laminar flow of this coolant in contact with the control rod. The division of the coolant flow is hydraulic manipulation to isolate the major portion of the flow from direct contact with the control rod. The internal diameter of the bypass tube provides backup mechanical limitations to radial movement of the control rod. All the flow-dividing structure, including the bypass tube, are ridigly mounted within what has been termed the tube sheet bypass tube. This tube sheet byapass tube is no more than an upward extension of the guide tube to form the storage for the control rod as it is supported by its CEA. This structure is formed and arranged so that it may be incorporated into the tube sheet tube as original equipment, or as a retrofit.

From the foregoing, it will be seen that this invention is one well adapted to attain all the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

I claim:

1. A nuclear control rod system having control rods and means for controlling the transverse vibration of the control rods, comprising,
    a guide tube aligned axially below a reciprocable control rod while the rod is in its stored position,
    a tube sheet tube in the form of a cylinder mounted on the upper discharge end of the guide tube and axially oriented with the guide tube,
    means for controlling the flow of liquid coolant up into the lower end of the guide tube for discharge from the upper end of the guide tube,
    a bypass tube mounted concentrically within the tube sheet tube and receiving the control rod therein,
    mounting structure between the lower end of the bypass tube and the tube sheet tube formed and arranged to provide a first path for a first portion of coolant discharged from the guide tube into the annular space between the bypass tube and the tube sheet tube and a second flow path for a second portion of coolant in the annular space between the control rod and the bypass tube,
    and an upper attachment between the upper portion of the bypass tube and the tube sheet tube formed and arranged to provide for coolant discharge passages from the upper end of the tube sheet tube,
    whereby any turbulence in the first portion of the coolant is isolated from direct contact with the control rod and the bypass tube mechanically limits the transverse vibration of the control rod to avoid destructive contact between the lower end of the control rod and the guide tube while the rod is in the stored position.

2. The system of claim 1, including,
    a plurality of openings near the lower end of the bypass tube for passing enough of the second portion of the coolant into the first portion of the coolant to maintain the remainder of the second portion in laminar flow up through the annular space between the control rod and the bypass tube.

3. The system of claim 2, in which,
    the plurality of openings are located substantially one foot above the lower end of the bypass tube.

4. The structure of claim 1, wherein,
    the bypass tube receives the control rod with a clearance in the order of 116 mils.

* * * * *